UNITED STATES PATENT OFFICE.

EMIL ERLENMEYER, OF FRANKFORT-ON-THE-MAIN, GERMANY.

PRODUCTION OF ROSANILINE COLORING-MATTERS.

SPECIFICATION forming part of Letters Patent No. 310,128, dated December 30, 1884.

Application filed April 1, 1884. (No specimens.)

*To all whom it may concern:*

Be it known that I, EMIL ERLENMEYER, a subject of the Emperor of Germany, and a resident at Frankfort-on-the-Main, Germany, have invented new and useful Improvements in Coloring-Matters, of which the following is a specification.

The object of my invention is a new method for the production of coloring-matters of the rosaniline series by the oxidation of various combinations or mixtures of methylated amines, methylated anilines, or methylated rosanilines with primary, secondary, or tertiary aromatic carmines. My method differs from all others hitherto employed in this respect, that in all cases the methyls (combined with nitrogen) of the first-called compounds are applied under the influence of oxidizing media, as so-called "methan carbons," in order to combine therewith always three automatic molecules of the other compound, as is shown in the following equations:

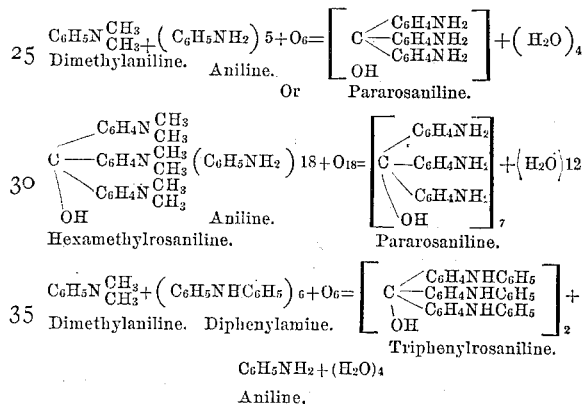

Many substances may be used as oxidizing media. For instance, to produce pararosaniline, I proceed in the following manner: One hundred and eighty parts (by weight) of dimethyl-aniline, three hundred and ninety parts of aniline chlorhydrate, five hundred and fifty-five parts of nitro-benzole, fifteen parts of iron filings, or two hundred parts (by weight) of methyl-violet, five hundred and eighty-two parts of aniline chlorhydrate, five hundred and fifty-five parts of nitro-benzole, fifteen parts of iron filings, are heated very gradually, while being stirred, to 180° centigrade, and kept at this temperature until a test portion of the mass solidifies when cold. Then the mass, with the addition of a little hydrochloric acid, is thoroughly boiled with water. The extracted product is salted out with common salt and further purified in the known way.

In the place of nitro-benzole and iron, arsenic acid or mercuric chloride may be used.

As a further example, I will now describe the production of diphenylamine blue: twenty parts (by weight) of dimethyl-aniline, one hundred and seventy parts of diphenylamine, fifty parts of acetic acid, (fifty per cent.,) one hundred parts of blue vitriol, and two thousand five hundred parts of common salt are mixed. The mixture is heated for twenty-four hours to a temperature of from 60° centigrade to 80° centigrade, spread out on tinned iron plates or in a suitable mixing apparatus which allows access of air. After the salts have been extracted from the mass by water the residue is dried and boiled with alcohol or converted into sulpho-acid in the known way.

Instead of the cupric salts nitroso-amines may be employed for oxidation, with the assistance of chloride of zinc.

Having thus described my invention, what I claim as new is—

The method of manufacturing coloring-matters of the rosaniline series of different composition by the oxidation of various combinations or mixtures of methylated amines or anilines or rosanilines with primary, secondary, or tertiary aromatic amines in such a way that the methyls of the former compounds are applied under the influence of oxidizing media, a methan carbon, in order to combine therewith always three aromatic molecules of the latter compounds, as shown by the foregoing equation and examples.

In testimony whereof I have signed my name to this specification in the presence of two subscribing witnesses.

EMIL ERLENMEYER.

Witnesses:
 FRANZ HASSLACHER,
 JOSEPH PATRICK.